Patented July 31, 1951

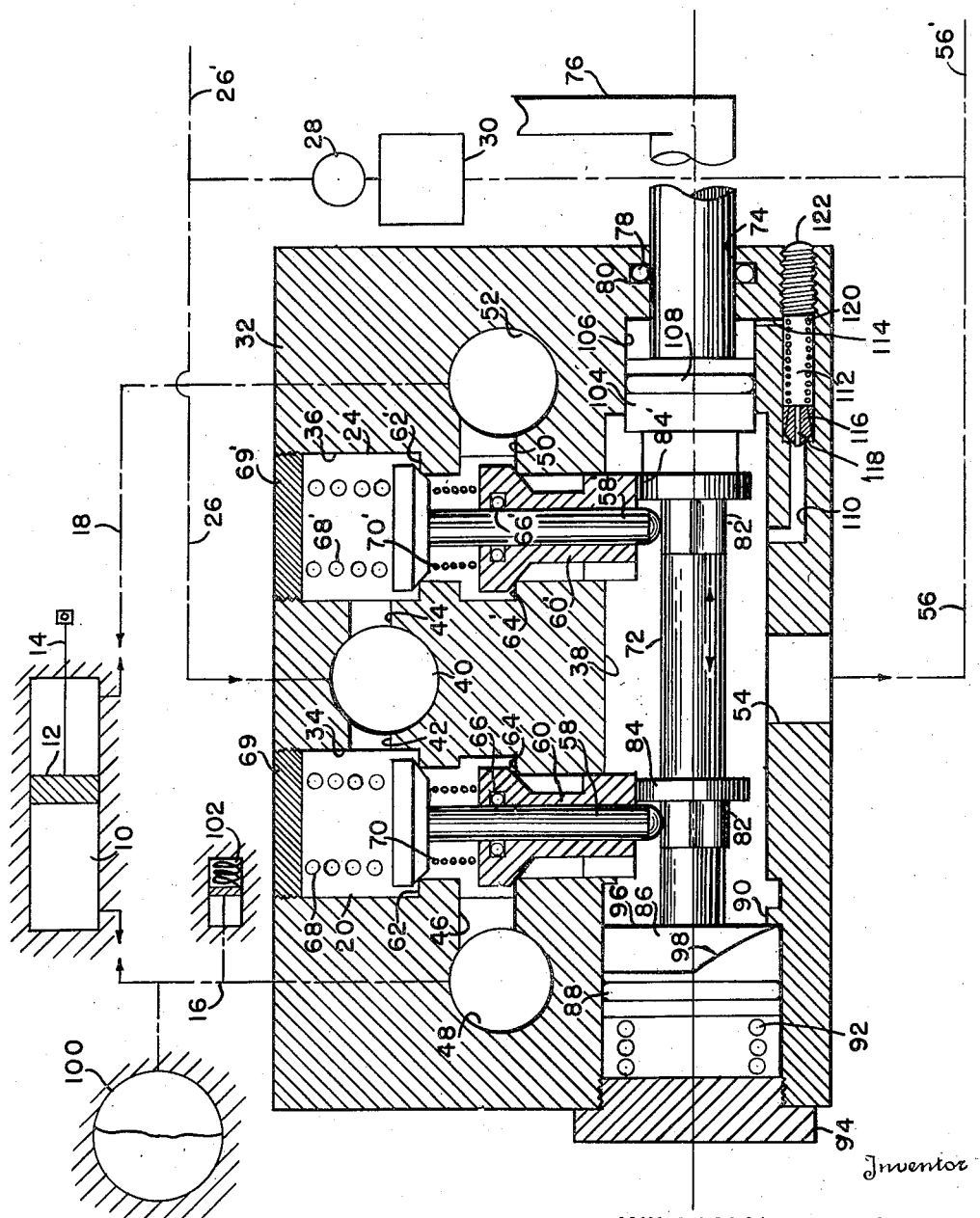

2,562,190

UNITED STATES PATENT OFFICE 2,562,190

AUTOMATIC TYPE FUSING VALVE

William A. Hopkins, United States Navy

Application November 25, 1944, Serial No. 565,170

24 Claims. (Cl. 137—144)

(Granted under the act of March 3, 1883, as amended April 30, 1928; 370 O. G. 757)

This invention pertains to fluid pressure systems for effecting operation of actuatable devices, and more especially to means for preventing a loss of fluid in a fluid pressure system in the event of failure in the fluid conduits.

Fluid pressure is being employed in an increasing number of apparatus to transmit and multiply forces, in place of linkage, to effect the operation of actuatable elements such as the movable head in a power press, brake bands and especially raising and lowering landing gear and operating air foils in planes. In automobiles and planes, where the failure of operating pressure due to leakage in the fluid conduits is very serious, since it will result in loss of control, it is desirable to provide a means to prevent the loss of fluid and to isolate the part effected while allowing other elements, also in the system, to continue to be operated.

It is an object of this invention to provide means which may be employed in any fluid pressure system, designed for the transmission of power, for checking the flow of fluid when a leak occurs in the fluid conduits so that the fluid in the system will not be exhausted.

The invention as illustrated herein comprises a fluid pressure system specifically a hydraulic system designed to lower or raise landing gear in an airplane, but may be just as well employed for operating the air foil, for example, the rudder, elevator, wing flaps or the brakes. In the illustrated hydraulic system which includes a pump for circulating oil under pressure through a series of fluid conduits, there is a valve for controlling the flow of oil. In one aspect invention resides in means arranged to engage the valve which is movable in rotation and translation and a manual control for rotating the aforesaid means to admit the high pressure oil to a working cylinder, the latter being coupled to the part to be actuated. Since the valve is mechanically operated by the pilot, if a break or leak has occurred in some part of the system such as by being pierced by a shell fragment, the high pressure oil may be forced out of the system before the pilot realizes there is such a leak and has an opportunity to close the valve. To prevent this contingency, there is other means which is so arranged that after the valve is opened to permit a flow of oil, a material diminution in the oil pressure will render the same effective to move the means engaging the valve in translation to disengage the same, and hence, to close the valve and stop the flow of oil. In such a system, there is bound to be a temporary diminution in the oil pressure at the instant the valve is initially opened due to lag in the flow of oil, air in the system and elements such as accumulators which take up a volume of oil each time the valve is opened which tends to cause the valve to close in the same manner as would the diminution in pressure due to a leak in the fluid line. A feature of this invention resides in a combination of means for closing the aforesaid valve upon a diminution in the pressure in the fluid conduits with means for delaying the action of the means for closing the valve for a time interval sufficient to permit the fluid pressure to build up to its normal amount in the system after the valve has been opened. More specifically, the fluid conduit which transmits oil to the power cylinder has a valve therein and a cam for unseating the valve, the cam being normally moved from a neutral position in which the valve is closed to an operative position in which the valve is unseated to permit the oil to flow. The cam is arranged for lateral movement with respect to the valve, means being provided for constantly urging it laterally, but is balanced, that is, restrained from lateral movement by the normal oil pressure in the system. Should this oil pressure diminish, however, the cam will tend to move laterally, and hence, to release the valve thereby to check the flow of oil through the valve. To prevent this lateral movement of the cam too soon, that is, during that momentary period when the oil is building up to its normal pressure after the valve is opened, there is a delay means in the form of a dash-pot having a bleeder passage of such size as to resist the means that urges the cam laterally for a sufficient time interval to permit the pressure to build up, if there is no break in the line. As shown herein, the cam is carried by a shaft having a piston head thereon which is normally held against lateral movement by the combined action of a spring on one side and a stop which engages the other side when the shaft is in its neutral position. The shaft may be manually rotated from its neutral position to an operative position to unseat the valve and in the operative position it will move laterally as the result of a diminution in oil pressure to reseat the valve. The stop which engages the piston head when the shaft is in its neutral position co-operates with a cam on the piston head and is rendered ineffective when the shaft is rotated to its operative position. The cam and stop afford means for returning the shaft laterally to its neutral position.

It is to be understood that invention also resides in a valve block for use in a fluid pressure system. As illustrated herein, the block contains a plurality of valves and has a chamber therein into which a portion of the valves project and which is in communication with the fluid pressure in the system. In the aforesaid chamber there is means for unseating the valve to permit a flow of high pressure fluid which means takes the form of a shaft movable in rotation and translation, means for rotating the shaft to unseat the valves, means including oil pressure for holding the shaft from movement in translation, said means being rendered effective upon a diminution in the pressure to permit translation of the shaft to disengage the cams from the valves, a second chamber in the block, a piston head on the shaft operable in said second chamber, a passage connecting said second chamber with the first chamber, and means for permitting oil freely to flow through said passage into said second chamber but restricting its flow from the second chamber to the first chamber.

The invention will now be described with reference to the accompanying drawing, in which the single figure shows a schematic view of a fluid pressure system embodying my invention.

Referring to the drawing, the fluid pressure system comprises a control cylinder 10 containing a piston 12 and piston rod 14. The piston rod is adapted to be connected to an element which is to be actuated, for example, the mechanism employed to raise or lower the landing wheels, the flap controls, elevators or the rudder. The piston 12 is caused to move from one end of the cylinder 10 to the other by means of high pressure fluid, for example, oil which is introduced at one end or the other of the cylinder 10 by way of fluid conduits 16 and 18, which are connected through valves 20 and 24 to a fluid conduit 26, the latter in turn being connected to a fluid pressure pump 28 and fluid reservoir 30. The valves 20 and 24 are adapted to control the flow of the high pressure fluid so that it may be caused to drive the piston 12 in one direction or the other depending upon the desired position of the element which is connected to the piston rod. While only one element is shown herein as actuated by the system it is obvious that other elements may similarly be actuated by way of branch conduits 26' and 56'.

The valves 20 and 24 are housed in a valve block 32 which has formed therein, a pair of recesses 34 and 36 adapted to receive the valves and a chamber 38 which communicates with the recesses 34 and 36, the purpose of which will appear hereinafter. The recesses 34 and 36 are connected to the fluid conduit 26 by way of an opening 40 formed in the block and lateral passages 42 and 44 which extend from the opening 40 to the recesses 34 and 36. The recess 34 is also connected by way of a lateral passage 46 with an opening 48 which in turn is connected to the fluid conduit 16. The recess 36 is likewise connected by way of a lateral passage 50 to an opening 52 which in turn is connected to the fluid conduit 18. The chamber 38 is provided with an opening 54 which is connected by way of a fluid conduit 56, which forms a return passage for part of the high pressure fluid, to the reservoir 30, hence forming a closed system.

Each valve assembly, 20 for example, comprises a valve 58 and a valve 60 concentrically arranged in telescopic fashion. The valve 58 is adapted to seat against a shoulder 62 formed peripherally of the recess 34 above the passage 46, and the valve 60 is adapted to seat against an annular shoulder 64 formed in the lower part of the recess 34 below the passage 46. A packing gland 66 is provided in the body of the valve 60 in the opening through which the stem of the valve 58 passes, hence preventing the leakage of oil along the stem. The valve 58 is held against its seat by a coil spring 68 which bears against the head of the valve and against a plug 69 threaded into the block at the top of the recess 34, and the valve 60 is held against its seat by a spring 70 which is disposed between the upper surface of its head and the lower surface of the head of the valve 58. The valve assembly 24 is a duplicate of the valve assembly 20, hence will not be described except to say that its corresponding parts are denoted by the same reference characters, with the addition of a prime.

The arrangement of the valves as described, is such that if the valve 58 is lifted from its seat, oil from the pump 28 will flow through the fluid pressure line 26, the opening 40, the passage 42 between the valve 58 and its seat 62 into the passage 46, the opening 48, the fluid pressure line 16, and hence, into the left end of the cylinder 10, thereby to force the piston 12 toward the right. The oil which is behind the piston 12, that is, at the right hand side thereof, at the same time is forced from the cylinder 10 through the fluid conduit 18, the opening 52, the passage 50 and beneath the valve 60' which, as will be seen hereinafter, is unseated simultaneously with the unseating of the valve 58. From there, the oil will pass into the chamber 38 under pressure through the opening 54 and fluid pressure line 56 back to the reservoir 30, not under pressure. The reverse of the operation which is described, will take place if the valves 58' and 60 are unseated.

To effect operation of the piston 12 in one direction or the other through the valve system described, there is provided a shaft 72 arranged longitudinally in the chamber 38 with one end thereof extending through an opening 74 in the block 32 and having at its end an operating lever 76 by which the shaft 72 may be rotated. A packing gland 78 is disposed in a groove 80 formed in the block 32 around the opening 74 to prevent oil from leaking outwardly along the shaft. On the shaft 72 adjacent to the lower ends of the valves are formed cams 82, 84, 82' and 84'. The cams 82 and 82' are disposed respectively at 90° on each side of the neutral position so that when the cam 82 unseats the valve 58, the cam 82' will not be in an operative position, that is, it will not unseat the valve 58'. The cams 84 and 84' are arranged in like manner and so disposed relative to the cams 82 and 82' that when the cam 82 is in a position to unseat the valve 58 the cam 84' will be in a position to unseat the valve 60'. The aforesaid cam surfaces formed on the shaft 72 occupy only one half of the peripheral section of the shaft and, hence, throughout the remaining peripheral portion of the shaft, the valves remain seated, that is, the shaft is said to be in a neutral position which is the position illustrated in the drawing. It is evident, therefore, that by rotating the lever 76 so as to turn the shaft 72 from its neutral position to bring the cam 82 into engagement with the lower end of the valve 58, the latter will be unseated while the valve 60 remains seated and the valve 60' will be unseated while the valve 58' remains seated. In this condition, if a break should occur in the fluid conduits 16 or 18, the high pressure fluid which is being forced through the system by the pump 28 would flow out through the break and thus the hydraulic fluid would be exhausted without the knowledge of the pilot. In order to prevent such a loss of fluid and automatically to close the valves, which were manually opened by rotation of the shaft 72, there is provided means for automatically reseating the opened valves upon a diminution in the pressure of the oil after the valves are opened. To this end a piston head 86 is fixed to the opposite end of the shaft 72 which is adapted to occupy the left end of the chamber 38, as seen in the drawing and is provided with a packing gland 88 to prevent oil from leaking by it. The piston head 86 is urged toward the right by a coil spring 92 disposed between the left side thereof and a plug 94 threaded into the end of the chamber 38. The shaft 72 is held against lateral movement toward the right, as urged by the spring 92, when it is in its neutral position, by a stop lug 90 formed on the inner surface of the chamber 38 which is adapted to engage the inner surface 96 of the piston head 86. A cam surface 98 is formed on the inner surface of the piston head 86 which is so shaped that when the shaft 72 is rotated from its neutral position to its operative position, that is, to a position in which the valves are opened, the lug 90 becomes ineffective to hold the shaft 72 from lateral movement. The area of the inner surface 96 of the piston head 86, however, is such that when the normal fluid pressure exists in the system, the pressure on the inner surface of the piston head will equal and balance the pressure exerted by the spring 92. As long as this pressure is maintained constant, the shaft 72 will remain in the position shown in the figure, and hence, the cams 82, 82', 84 and 84' will remain adjacent to and in operative relation with the valves. If, however, a leak occurs in one of the fluid pressure lines 16 and 18, and the pressure begins to fall, the spring 92 will immediately become effective and begin to push the piston head 86 and hence the shaft 72 toward the right end of chamber 38. If this continues, the cams 82, 82', 84 and 84' will be moved from beneath the valves, and hence, allow the valves 58 and 58' to close so that no fluid will be permitted to pass beyond these valves, and hence, no further loss will take place. It is to be observed that with such an arrangement other elements connected to the system may continue to operate since the valves described cut off the flow of fluid only through the circuit which includes the conduits 16 and 18.

In hydraulic systems of this type, when valves such as have been described are opened to actuate a device as indicated above, there is a momentary diminution in the fluid pressure due to the fact that it takes a finite time for the oil to flow through the valve openings and build up to its normal pressure on the other side. This lag in the development of normal pressure is more pronounced if the systems include an accumulator 100 or a lock 102 which take up a definite volume of fluid, so that the pressure will not build up to normal until these elements have been filled. This diminution of pressure is of sufficient magnitude to allow the spring 92 to force the piston head, and hence, the shaft 72 toward the right, and thereby to close the valves and shut off the entire system.

The present invention is concerned with means for avoiding such a contigency and as shown herein, comprises means for delaying the lateral movement of the shaft 72 toward the right under the influence of the spring 92 when the fluid pressure is diminished for a length of time which would normally be sufficient to build up the normal pressure necessary to oppose the action of the spring 92. If at the end of this time a normal fluid pressure is not built up, then the movement of the shaft 72 toward the right to reseat the valves 58 and 58' will take place. To this end there is formed on the shaft 72 a piston head 104 which is adapted to occupy a chamber 106 formed at the right end of the chamber 38, the piston having a packing gland 108 therein to prevent the passage of oil around it. The chamber 106 which is behind the piston 104 is connected to the chamber 38 by way of a passage 110, a recess 112, and a passage 114, all of which are formed in the block. In the recess 112, there is disposed a valve 116 having a bleeder passage 118 therein, the valve 116 being spring pressed toward the end which is connected with the passage 110 by a spring 120. The rear end of the recess 112 is closed by a threaded plug 122. With this construction, it is apparent that when a normal pressure exists in the chamber 38, oil will flow through the passage 110 and unseat the valve 116, whereupon it will flow through the passage 114 into the chamber 106 behind the piston rod so that the pressure behind the piston 104 is equal to that in the chamber 38. If, however, the fluid pressure in the chamber 38 falls and the spring 92 begins to force the shaft 72 toward the right, the movement in this direction will temporarily be opposed by the body of oil which occupies the chamber 106. This oil will bleed from the chamber 106 through the bleeder passage 118 into the chamber 38, but since the bleeder passage forms a constriction through which the oil will only pass with difficulty it will take a finite time for the oil to be forced out of the chamber 106, and the constriction and volume of the chamber are so designed that if the diminution in pressure is only for a short period such as would be necessary to take care of the lag in the build up of fluid pressure as described above, the shaft 72 will not move far enough to the right to release the valves, and hence, when the pressure reaches its normal amount the shaft will move back to its original position. If, however, the pressure continues to decrease the oil in the chamber 106 will be forced out until the shaft 72 moves completely to the right and the valves are seated.

It is evident that the aforesaid mechanism will hold the shaft 72 in its operative position each time it is rotated from neutral to operative position in spite of a temporary diminution in oil pressure.

From the description set forth above, it is apparent that the operation of the device takes place as follows: When the pilot wishes, for example, to lower his landing gear, he rotates the shaft 72 by means of the lever 76 which raises one or the other of the valves 58 and 58'. This allows high pressure fluid to be forced through the fluid pressure line 26 from the pump 28 through the valve 58, for example, the passage 46, the conduit 16, and into the left end of the cylinder 10 where it pushes the piston 12 to the right and forces the fluid at the right side of the piston through the conduit 18, the conduit 50, the valve 60', the opening 54, and the conduit 56 back to the reservoir 30. If, for example, a shell fragment should destroy one of the fluid conduits, the pressure will immediately drop in the chamber 38 which will then allow the piston head 86 to push the shaft 72 toward the right under the influence of the spring 92. As this occurs, fluid in the chamber 106 is driven out through the bleeder 118 into the chamber 38. When the shaft has moved laterally so that the cams 82, 82', 84 and 84' are moved from beneath the valves, the latter will seat and cut off the flow of high pressure fluid in the system. Hence, the oil in the system will be prevented from flowing out through the break. When the break is repaired, the system may be set back into operation merely by returning the lever 76 to its neutral position which will move the shaft 72 to the left due to the cooperation between the stop lug 90 and the cam 98. If no break occurred in the line, and the diminution in pressure was merely temporary due to the inherent lag in the flow of oil and certain volume consuming devices in the system, the movement of the shaft 72 to the right will be delayed by the dash-pot operation of the piston 104 in the chamber 106 for a sufficient time interval to prevent the shaft 72 from moving far enough to the right to seat the valves, and hence, to shut off the system.

The invention described herein may be manufactured and used by or for the Government of the United States of America for governmental purposes without the payment of any royalties thereon or therefor.

What is claimed is:

1. In a fluid pressure conduit containing a valve biased to close said conduit, means engaging said valve and movable in one direction to unseat said valve when so engaged, said means being movable in another direction to a position of disengagement with said valve, means for moving said first named means in one direction to unseat the valve to permit a flow of fluid through said conduit, and means rendered effective by a diminution in the fluid pressure in said conduit to below a predetermined amount to move said first named means in said other direction thereby to disengage said valve and to permit said valve to be reseated.

2. In a fluid pressure conduit containing a valve biased to close said conduit, means movable from one position to another to unseat said valve thereby to permit the fluid to flow from one side of said valve to the other side thereof, means for rendering the first named means ineffective if the fluid pressure falls below a predetermined amount in said conduit, and means for delaying the action of the last named means for a time interval sufficient to permit an initial build up of said pressure to said predetermined amount in said conduit after said valve is unseated.

3. In a hydraulic system including a fluid pressure conduit containing a valve biased to close said conductor, means movable from one position to another to unseat the valve thereby to permit the fluid to flow from one side of said valve to the other side thereof, resilient means for rendering the first-named means ineffective if the pressure does not build up to a predetermined amount at said other side of the valve, and means for delaying the action of the last named means sufficiently to permit an initial build up of pressure to said predetermined amount on said other side of said valve after said valve is unseated.

4. In a fluid pressure conduit containing a valve biased to close said conduit, means movable from one position to another to unseat the valve thereby to permit fluid to flow from one side of said valve to the other, means including a spring arranged to render the first-named means ineffective if the pressure in said conduit drops below a predetermined amount, and means for delaying the action of the last-named means sufficiently to permit an initial build up of pressure to said predetermined amount in said conduit after said valve is unseated.

5. In a hydraulic system including a fluid pressure circuit containing a valve, biased to close said circuit, means movable in one direction from a neutral position to an operative position to unseat the valve thereby to permit the fluid to flow from one side of said valve to the other, means for effecting movement of said first named means in another direction to return said valve to its biased position if the fluid pressure in the circuit falls below a predetermined amount at said other side of said valve, and means for opposing the movement of said first named means in said other direction for a sufficient time interval to permit an initial build up of pressure to said predetermined amount on said other side of said valve after said valve is unseated.

6. In a fluid pressure system including a valve adapted to control the flow of high pressure fluid therein, means for engaging said valve and by movement in one direction from a neutral position to an operative position to unseat the valve thereby to permit fluid to flow from one side of said valve to the other side thereof, means for effecting movement of said first named means in another direction without returning it to neutral position to a position of disengagement of said first-named means from said valve if the fluid pressure in the system falls below a predetermined amount whereby said valve may be reseated, and means for opposing the movement of said first named means in said other direction for a sufficient time interval to permit an initial build up of pressure to said predetermined amount on said other side of said valve after it is unseated.

7. In a fluid pressure system in which there is a valve adapted to control the flow of high pressure fluid therein, means for engaging the valve and by movement in one direction from a neutral position to an operative position to unseat the valve thereby to permit high pressure fluid to flow from one side of said valve to the other side, said means being movable in another direction to a position of disengagement from the valve, means utilizing the fluid pressure for preventing movement of said first named means in said other direction but upon diminution of said fluid pressure for moving said first named means to said disengagement position, and means for delaying the movement of said first named means in said other direction until such time as the pressure can build up initially.

8. In a hydraulic system including a valve adapted to control the flow of fluid therein, a cam engaging the valve and rotatable in one direction from a neutral position to an operative position to unseat the valve thereby to permit fluid to flow from one side of said valve to the other, means for moving said cam in another direction while in said operative position to a position of disengagement with the valve whereby the valve is permitted to be reseated, said means being rendered operative by a diminution in the fluid pressure in the system to below a predetermined amount, and means for delaying the effectiveness of the first named means for a sufficient time interval to permit an initial build up of pressure.

9. In a hydraulic system including a valve adapted to control the flow of high pressure fluid therein, a cam engaging the valve and rotatable in one direction from a neutral position to an operative position to unseat the valve thereby to permit fluid to flow through said valve, a spring urging the cam while in its operative position axially to a position of disengagement with said valve, the axial movement of said cam being opposed by the fluid pressure in the system but being permitted by a deminution in the fluid pressure to below a predetermined amount, and means for delaying the axial movement of the cam upon a diminution of the fluid pressure until such time as the fluid would initially build up to its full pressure.

10. In a hydraulic system which includes a valve adapted to control the flow of high pressure fluid therethrough, a cam shaft having a cam engaging said valve and rotatable in one direction from a neutral position to an operative position to unseat the valve thereby to permit fluid to flow through said valve, means urging said shaft axially to disengage said cam from the valve upon a diminution in the pressure in the system to below a predetermined amount, and a dash-pot arranged to delay the axial movement of said shaft as the valve is initially opened to permit an initial build up in the pressure.

11. In a hydraulic system including a valve adapted to control the flow of high pressure fluid therein, a cam engaging the valve and rotatable in one direction from a neutral position to an operative position to unseat the valve thereby to permit fluid to flow through said valve, means urging said cam axially while in an operative position to a position of disengagement of the cam from the valve, said cam being held from axial movement by the fluid pressure and being movable axially by a diminution in the fluid pressure to below a predetermined amount, and a dash-pot having a bleeder port operable to delay the axial movement of said cam upon diminution of the fluid pressure.

12. In a hydraulic system including a valve adapted to control the flow of high pressure fluid therein, a cam shaft provided with a cam thereon engaging the valve, means for rotating the cam shaft in either direction from a neutral position to an operative position to unseat the valve, means for moving said shaft longitudinally to a position of disengagement of said cam from said valve, said means comprising a piston head on said shaft, a spring urging said piston head in one direction, the fluid pressure urging said piston head in the opposite direction, said spring and fluid pressure balancing each other, and means for delaying the lateral movement of the piston head upon a diminution of the fluid pressure when the valve is initially opened to permit an initial build up of the fluid pressure.

13. In a hydraulic system including a valve adapted to control the flow of high pressure fluid therein, means movable from a neutral position in one direction to an operative position to unseat the valve thereby to permit fluid to flow through the valve to the opposite side thereof, said means being movable in an axial direction, although in its operative position, to a position of disengagement from the valve, means for locking said first named means from axial movement while in its neutral position, said locking means being rendered ineffective when said first named means is moved to its operative position, means constantly urging said first named means in said axial direction and effective to move said first-named means to said position of disengagement from the valve upon a diminution in the fluid pressure in the system to below a predetermined amount, and means for delaying said lateral movement.

14. In a hydraulic system including a valve adapted to control the flow of high pressure fluid therein, a shaft having a cam thereon engaging said valve, means for rotating the shaft to cause said cam to unseat the valve, a spring arranged to move the shaft axially to a position of disengagement of the cam from the valve, means for locking the shaft against axial movement while in a neutral position, said locking means being ineffective when said shaft is in an operative position, means utilizing the fluid pressure in the system for preventing axial movement of said shaft when in an operative position whereupon a diminution in fluid pressure will permit axial movement of the shaft, and means for relaying the axial movement of the shaft for a predetermined length of time after said valve is unseated.

15. In a hydraulic system including a valve adapted to control the flow of high pressure fluid in the system, a shaft having a cam thereon engaging said valve, means for rotating the shaft to cause said cam to unseat the valve, a spring arranged to urge the shaft axially to a position of disengagement of the cam from the valve whereby said valve may be reseated, means for locking the shaft against axial movement while in a neutral position, said locking means being ineffective when the shaft is in an operative position, means utilizing the fluid pressure in the system for preventing axial movement when the shaft is in an operative position whereupon a diminution of the fluid pressure will permit axial movement of the shaft to the position of disengagement of the valve and the cam, and means for delaying axial movement of the shaft.

16. A valve block for use in a high pressure fluid system, said block containing a plurality of valves and seats therefor, a chamber in said block into which a portion of the valves project and which is adapted to communicate with the fluid system, means in the chamber for unseating the valves to permit a flow of fluid therethrough, means operable after unseating of the valves to render the aforesaid means ineffective if the pressure in the chamber falls below a predetermined amount, and means for delaying the operation of said last named means for a predetermined time.

17. A valve block for use in a high pressure fluid system, said block containing a plurality of valves and seats therefor, a chamber in said block into which a portion of the valves project and which is adapted to communicate with the fluid system, a shaft in said chamber having cams thereon engaging said valves and operable upon rotation of the shaft to unseat said valves to permit a flow of high pressure fluid therethrough, means operable after unseating of the valves to render the aforesaid cams ineffective if the pressure in the chamber falls below a predetermined amount, and means for delaying the operation of said last named means for a predetermined time.

18. A valve block for use in a high pressure fluid system, said block containing a plurality of valves and seats therefor, a chamber in said block into which a portion of the valves project and which is adapted to communicate with the fluid system, a shaft in said chamber movable in rotation and translation, cams on said shaft engaging said valves, means for rotating the shaft to cause the cams to unseat said valves, means utilizing the fluid pressure in the chamber for holding the shaft from movement in translation, said means being effective upon a diminution in the pressure in the chamber to permit translational movement of the shaft to a position of disengagement of the cams from the valves, and means for delaying the translational movement of the shaft for a predetermined time.

19. A valve block for use in a high pressure fluid system, said block containing a plurality of valves and seats therefor, a chamber in said block into which a portion of the valves project and which is adapted to communicate with the fluid system, a shaft in said chamber movable in rotation and translation, cams on said shaft engaging said valves, means for rotating the shaft to cause the cams to unseat the valves, thereby to permit fluid to flow therethrough, a piston head on said shaft exposed at one side to the fluid pressure in the chamber, a spring arranged to engage the opposite side of the piston head to urge the shaft to move in translation, said shaft being prevented from movement by the pressure of the fluid on said one side whereupon a diminution in fluid pressure in the chamber will allow translation of the shaft to a position of disengagement of said cams from said valves to allow them to reseat, and means for delaying the movement of the shaft in translation for a predetermined time.

20. A valve block for use in a high pressure fluid system containing a plurality of valves and seats therefor, a chamber in said block into which a portion of the valves project and which is adapted to communicate with the fluid system, a shaft in said chamber movable in rotation and translation, cams on said shaft engaging said valves, means for rotating the shaft to cause the cams to unseat the valves thereby to permit fluid to flow therethrough, a piston head on said shaft exposed on one side to the fluid pressure in the chamber, a spring arranged to engage the opposite side of the piston to urge the shaft to move in translation, said shaft being prevented from movement by the fluid pressure in the chamber and being permitted to move by a diminution in the fluid pressure in the chamber to a position of disengagement of the cams from the valves thereby to permit them to reseat, and hydraulic means for delaying the movement of the shaft in translation for a predetermined time after said valves are unseated.

21. A valve block for use in a high pressure fluid system, said block containing a plurality of valves and seats therefor, a chamber in said block into which a portion of the valves project and which is adapted to communicate with the fluid pressure in the system, a shaft in said chamber movable in translation and rotation, cams on said shaft engaging said valves, means for rotating said shaft to unseat said valves thereby to permit fluid to flow therethrough, means utilizing fluid pressure in the chamber for holding the shaft against translation, said utilizing means being operable upon a diminution in pressure in the chamber to cause translation of said shaft to a position of disengagement of the cams from said valves, a piston on said shaft, a second chamber behind said piston, a passage connecting said second chamber with said first named chamber, and means for permitting fluid freely to flow through said passage into said second chamber but restricting its flow from said second chamber to said first chamber.

22. In a fluid pressure conduit containing a valve biased to close said conduit, means engaging said valve and rotatable to unseat the same when so engaged, said means being movable in translation to a position of disengagement with said valve, means for rotating the first-mentioned means to unseat the valve to permit a flow of fluid through said conduit, and means rendered effective by a diminution in the fluid pressure in said conduit to below a predetermined amount for moving said first-mentioned means in translation to said position of disengagement thereby permitting said valve to be reseated.

23. In a fluid pressure conduit containing a valve biased to close said conduit, means arranged on translational movement to engage said valve and when so engaged rotatable to effect unseating thereof to permit a flow of fluid through said conduit, means for rotating the first-named means to the unseating position, and means responsive to a diminution of the fluid pressure in said conduit to below a predetermined amount for moving said first-named means in translation to a position of disengagement with said valve thereby permitting said valve to be reseated.

24. In a fluid pressure system including a valve for controlling the flow of fluid therein, means engaging said valve and movable thereafter in one direction to unseat the valve thereby to permit fluid to flow from one side of said valve to the other, a spring engaging and urging the first-named means in another direction, said first-named means being held from such movement by the fluid pressure in the system and movable upon a diminution of the fluid pressure in the system to below a predetermined amount under the urging of said spring to a position of disengagement from said valve thereby permitting said valve to be reseated, and means for delaying the movement of said first-named in said other direction for a predetermined time to permit an initial build up of the fluid pressure in the system after the valve is unseated.

WILLIAM A. HOPKINS.

REFERENCES CITED

The following references are of record in the file of this patent:

UNITED STATES PATENTS

| Number | Name | Date |
|---|---|---|
| 960,872 | Fischer | June 7, 1910 |
| 1,725,826 | Payne | Aug. 27, 1929 |
| 1,890,847 | Flory | Dec. 13, 1932 |
| 1,990,741 | Marvel | Feb. 12, 1935 |
| 2,004,145 | Wineman | June 11, 1935 |
| 2,103,962 | Wineman | Dec. 28, 1937 |
| 2,229,543 | Bailey | Jan. 21, 1941 |
| 2,246,379 | Muir | June 17, 1941 |
| 2,282,490 | Martin | May 12, 1942 |
| 2,381,447 | Hedene | Aug. 7, 1945 |